(12) United States Patent
Gupta et al.

(10) Patent No.: US 12,639,507 B2
(45) Date of Patent: May 26, 2026

(54) COMPUTING A CREDIBILITY SCORE OF AN ONLINE ARTICLE

(71) Applicant: DigiCert, Inc., Lehi, UT (US)

(72) Inventors: Atul Gupta, Cupertino, CA (US);
Avesta Hojjati, Austin, TX (US)

(73) Assignee: DigiCert, Inc., Lehi, UT (US)

( * ) Notice: Subject to any disclaimer, the term of this patent is extended or adjusted under 35 U.S.C. 154(b) by 162 days.

(21) Appl. No.: 18/426,781

(22) Filed: Jan. 30, 2024

(65) Prior Publication Data

US 2025/0245416 A1 Jul. 31, 2025

(51) Int. Cl.
*G06F 17/21* (2006.01)
*G06F 16/16* (2019.01)
*G06F 40/10* (2020.01)

(52) U.S. Cl.
CPC ............ *G06F 40/10* (2020.01); *G06F 16/164* (2019.01)

(58) Field of Classification Search
CPC .... G06Q 30/018; G06Q 50/26; G06Q 50/265; G06Q 10/0635; G06Q 30/0248; G06Q 50/18; G06F 21/6245; G06F 16/93; G06F 16/164; G06F 21/577; G06F 21/62; G06F 21/71; G06F 21/57; G06F 21/645; G06F 21/64; G06F 40/10; G06F 40/169
See application file for complete search history.

(56) References Cited

U.S. PATENT DOCUMENTS

| | | | |
|---|---|---|---|
| 9,503,452 B1 | 11/2016 | Kumar et al. | |
| 9,836,461 B1 * | 12/2017 | Mishne ................... | G06F 16/93 |
| 10,469,480 B2 | 11/2019 | Kumar et al. | |
| 10,764,040 B2 | 9/2020 | Kumar et al. | |
| 11,074,367 B2 | 7/2021 | Brannon et al. | |
| 11,275,800 B2 * | 3/2022 | Jalleh ................... | G06F 16/951 |
| 11,403,402 B2 | 8/2022 | Kumar et al. | |
| 11,595,217 B2 | 2/2023 | Kumar et al. | |
| 2013/0218788 A1 * | 8/2013 | Terheggen ........... | G06Q 30/018 |
| | | | 705/317 |
| 2015/0220649 A1 * | 8/2015 | Papa ................... | G06F 16/9535 |
| | | | 707/722 |
| 2018/0046817 A1 | 2/2018 | Gupta | |
| 2018/0253814 A1 * | 9/2018 | Kaguma ............. | G06Q 50/265 |
| 2020/0169539 A1 | 5/2020 | Kumar et al. | |
| 2021/0350388 A1 | 11/2021 | Brannon et al. | |
| 2021/0397668 A1 * | 12/2021 | Milazzo .............. | G06F 16/3328 |
| 2023/0300129 A1 | 9/2023 | Hojjati et al. | |
| 2023/0325897 A1 * | 10/2023 | Dye ....................... | G06V 20/46 |
| | | | 705/26.35 |
| 2023/0344639 A1 | 10/2023 | Hojjati et al. | |

(Continued)

FOREIGN PATENT DOCUMENTS

WO WO-2022087497 A1 * 4/2022 ........... G06F 40/279

*Primary Examiner* — Michael Ortiz-Sanchez

(74) *Attorney, Agent, or Firm* — Baratta Law PLLC; Lawrence A. Baratta, Jr.

(57) ABSTRACT

Systems and methods for analyzing online content are provided. In one implementation, a method includes a step of evaluating an online article to derive credibility information, wherein the online article includes textual and/or graphical content that is accessible via one or more content-sharing platforms. The method also includes a step of adding the credibility information to metadata associated with the online article such that the credibility information is viewable by an end user when the online article is accessed.

20 Claims, 7 Drawing Sheets

(56) References Cited

U.S. PATENT DOCUMENTS

| | | | |
|---|---|---|---|
| 2023/0344650 A1 | 10/2023 | Hojjati et al. | |
| 2023/0385811 A1 | 11/2023 | Naidoo et al. | |
| 2024/0320442 A1* | 9/2024 | Filipowicz | G06V 30/19093 |

* cited by examiner

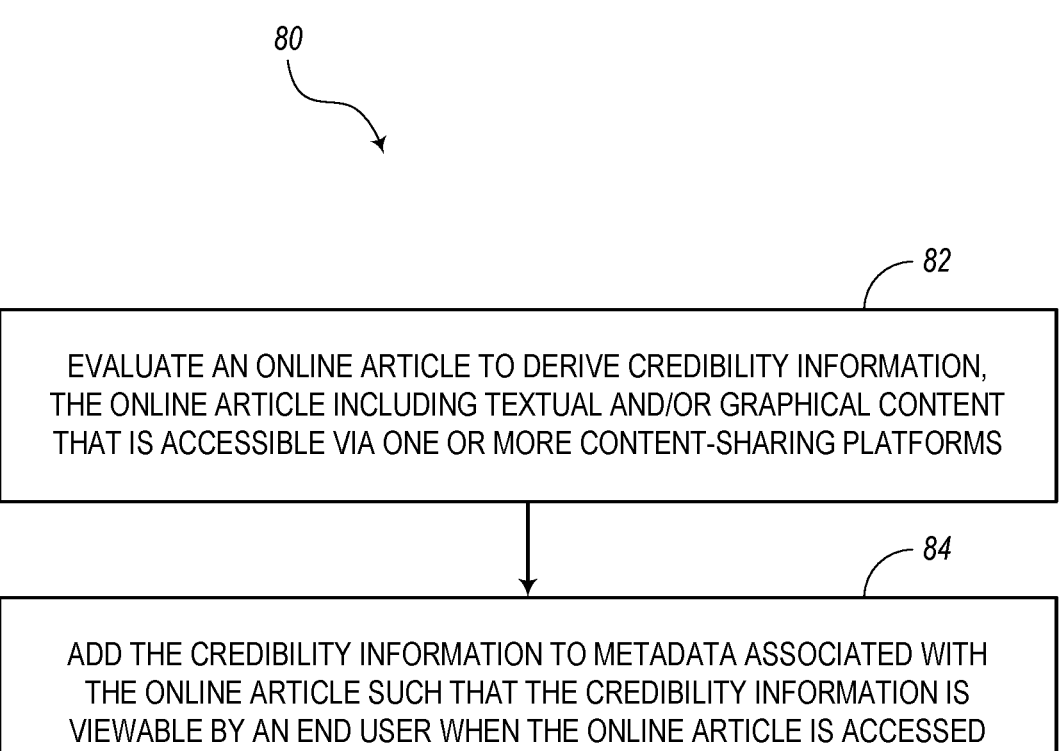

*80*

*82*

EVALUATE AN ONLINE ARTICLE TO DERIVE CREDIBILITY INFORMATION, THE ONLINE ARTICLE INCLUDING TEXTUAL AND/OR GRAPHICAL CONTENT THAT IS ACCESSIBLE VIA ONE OR MORE CONTENT-SHARING PLATFORMS

*84*

ADD THE CREDIBILITY INFORMATION TO METADATA ASSOCIATED WITH THE ONLINE ARTICLE SUCH THAT THE CREDIBILITY INFORMATION IS VIEWABLE BY AN END USER WHEN THE ONLINE ARTICLE IS ACCESSED

FIG. 7

COMPUTING A CREDIBILITY SCORE OF AN ONLINE ARTICLE

FIELD OF THE DISCLOSURE

The present disclosure relates generally to online articles and publications. More particularly, the present disclosure relates to systems and methods for evaluating online articles to compute a credibility score.

BACKGROUND OF THE DISCLOSURE

Currently, textual and/or graphical content can be easily shared over the Internet by online news agencies, influencers, bloggers, and others. Although there are many benefits to easily sharing content, there are also many disadvantages as well, particularly when the content provider includes hateful speech, falsehoods, logical fallacies, propaganda, biased views, etc. Often, it is difficult for the average content consumer to discriminate between what is true, what is false, what is opinion, etc. For example, some extreme news agencies seem to perpetuate the philosophy that "All Democrats are always right all the time and that all Republicans are always wrong all the time," while other extreme news agencies seem to perpetuate the philosophy that "All Republicans are always right all the time and that all Democrats are always wrong all the time." It can be easy for the average person to simply trust whatever online articles he or she has seen or read without question and without further research into the credibility of the information. In addition to political affiliations, other issues (e.g., how people should behave during the COVID-19 pandemic) have been presented in very biased ways, leading to divisions throughout the world. A problem with the current systems, therefore, is that there is no definite way for a content consumer to differentiate between fake and real content or more importantly to understand where the content is coming from, being aggregated from, etc. There is currently no way for a content consumer to obtain a trusted list of all sources (e.g., ingredients, components, resources, etc.) which were used to compose, derive, and/or aggregate the shared content.

BRIEF SUMMARY OF THE DISCLOSURE

The present disclosure relates to systems and methods for evaluating online content to determine the credibility of the content. In various embodiments, the present disclosure includes a method having steps, a processing device configured to implement the steps, a cloud service configured to implement the steps, and a non-transitory computer-readable medium storing instructions for programming one or more processors to execute the steps. Methods and processes may include steps and/or computer logic stored on one or more non-transitory computer-readable media for implementation or execution by one or more processors. The computer logic of the methods may be implemented as code that is executable by one or more processors.

According to one implementation, a method includes a step of evaluating an online article to derive credibility information. The online article, for example, may include textual and/or graphical content that is accessible via one or more content-sharing platforms. Furthermore, the method includes a step of adding the credibility information to metadata associated with the online article such that the credibility information is viewable by an end user when the online article is accessed.

In some embodiments, the credibility information may include a credibility score. The method may further include a step of calculating the credibility score based on a publisher credibility score, a plurality of ingredient credibility scores related to a plurality of ingredients making up the textual and/or graphical content of the online article, and a third-party verification credibility score. The step of calculating the credibility score, for example, may include weighting each of the plurality of ingredient credibility scores based on an estimated percentage that each respective ingredient contributes overall to the online article. The method may further include a step of updating the credibility score based on changes to the publisher credibility score, plurality of ingredient credibility scores, and/or third-party verification credibility score.

According to additional implementations, the method may further include a step of determining a chain or tree that includes provenance information (e.g., source information, origination information, etc.) regarding a plurality of ingredients that make up the textual and/or graphical content of the online article. The method may further include the steps of a) creating an immutable file including the provenance information and publication dates of each ingredient, and b) adding the immutable file to the metadata. For each ingredient, the method may include a step of determining an accuracy of a citation, interpretation, or translation of the respective ingredient with respect to the online article.

In addition, the method may further include a step of determining whether the textual content includes one or more instances of satire, parody, opinion, unverifiable statements, inaccurate statements, propaganda, deceptive title, and/or logical fallacies. Also, the method may include a step of incorporating information regarding the one or more instances within the metadata to enable the end user to view the one or more instances along with the textual content. Furthermore, the method may enable a third-party reviewer to modify or add to the credibility information based on presence of the one or more instances.

In some embodiments, the method may further include a step of creating a view that includes at least a portion of the textual and/or graphical content and at least a portion of the metadata. This portion of the metadata may include at least a credibility score that estimates credibility of the online article. The method may further include a step of enabling the end user to expand a window to view a larger portion of the metadata. Furthermore, the method may also include a step of enabling one or more third-party reviewers to analyze the online article to determine the accuracy of the credibility information and to modify the credibility information accordingly. Also, the method may include a step of enabling the one or more third-party reviewers to apply an X509 certificate to the online article.

BRIEF DESCRIPTION OF THE DRAWINGS

The present disclosure is illustrated and described herein with reference to the various drawings, in which like reference numbers are used to denote like system components/method steps, as appropriate, and in which:

FIG. 7 is a flow diagram illustrating a method for evaluating online articles, according to various embodiments.

DETAILED DESCRIPTION OF THE DISCLOSURE

Again, the present disclosure relates to systems and methods for evaluating online content (e.g., articles, posts, etc.) on any content-sharing platform. The evaluation of the content may be performed by a trusted, unbiased third party, which may use sound fact checking procedures for determining the actual origin or various components (e.g., statements, statistics, conclusions, etc.) of an online article and also determining the credibility of the online article and each of its individual components or ingredients. Furthermore, the systems and methods may be configured to add the credibility information to metadata that is associated with the online article. This credibility information can then be displayed with the online article to give the content consumer immediate information regarding the reliability of the content they are currently consuming. For example, if the credibility score for the online article is low, the content consumer is given an indication that what they are reading or viewing may not be completely trustworthy. It is believed that the systems and methods of the present disclosure can then slow (or ultimately eliminate) the spread of misinformation, conspiracy theories, hoaxes, etc.

Content Sharing System

Figure 1:
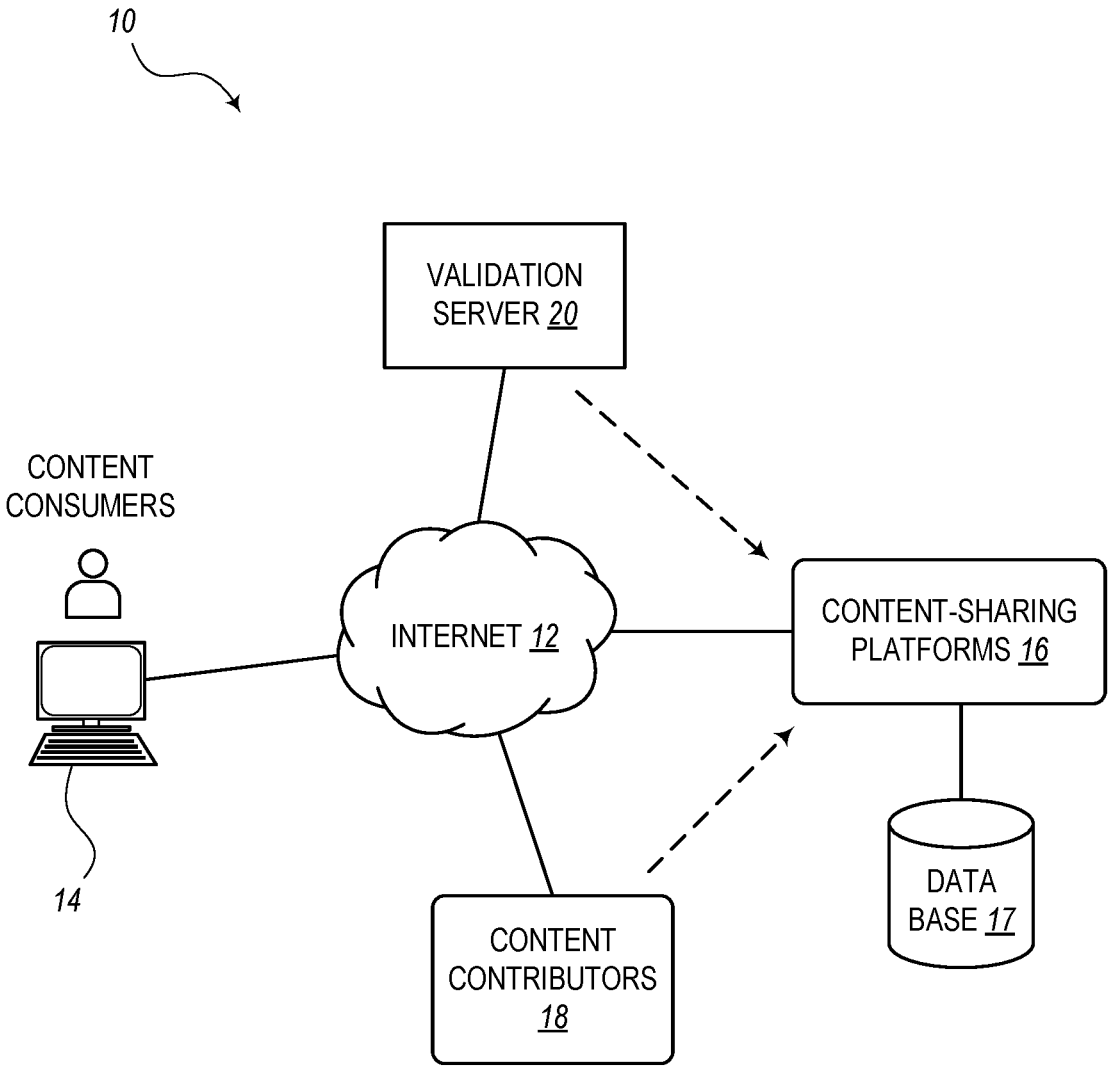
FIG. 1 is a diagram illustrating a system for enabling the sharing of textual and/or graphical content, according to various embodiments.

FIG. 1 is a diagram illustrating an embodiment of a system 10 for enabling the sharing of textual and/or graphical content. The system 10 may include at least a Wide Area Network (WAN) to enable the transmission of content, such as the Internet 12. The system 10 also includes a plurality of content consumers 14 or end users, who can use any suitable device (e.g., personal computer, laptop computer, smart phone, tablet, etc.) for accessing information from the Internet 14, such as online articles, online publications, posts, blogs, etc.

For example, a plurality of content-sharing platforms 16 (e.g., Facebook, Instagram, TikTok, online news websites, etc.) are configured to enable the content consumers 14 to access a plurality of online articles, publications, etc., which may be stored in one or more databases 17. Also, a plurality of content contributors 18 may be configured to upload online articles, publications, posts, etc. to the content-sharing platforms 16 to enable access to the online articles, publications, posts, etc. by the content consumers 14. The content contributors 18 may include any number of reliable or unreliable sources. In some embodiments, the content contributors 18 may be ordinary end users (e.g., content consumers 14) who can post articles, comments, etc. on the content-sharing platforms 16 and/or may be professional journalists (e.g., biased journalists and/or relatively unbiased journalists), scientific journal publishers, etc. In some embodiments, the content contributors 18 may be directed associated with the content-sharing platforms 16, whereby uploaded articles or publications can be stored directly in the database 17 without traversing the Internet 12.

Furthermore, the system 10 includes a validation server 20, which may be configured to evaluate one or more online articles that can be shared by one or more of the content-sharing platforms 16 to determine the credibility of the articles. Based on the evaluation, the validation server 20 can add credibility information (e.g., a credibility score and other information) to metadata that is maintained with the articles. Then, when the content consumer 14 accesses the online article, the credibility information is readily available. For example, in some embodiments, a credibility score can be displayed (e.g., in a small box superimposed over a corner of the online article) such that the content consumer can know upfront whether or not the article is true, false, likely true, likely false, etc. Also, the credibility information can show addition aspects of the online article (e.g., whether the article is satire or an opinion, how closely the article quotes its sources, what resources the article relies upon and the reliability or credibility of each of these resources, etc.).

In some embodiments, the validation server 20 may be a third-party system that is a trusted source, fact checker, etc. The validation server 20 may include automatic analysis of statements and statistics included in the online articles and/or may enable a trusted person or team to evaluate the credibility of the statement and statistics to determine the accuracy that the article cites its sources, whether or not the article arrives at a different conclusion than its sources, whether or not facts or statistics have been twisted to intentionally deceive its viewers (e.g., content consumers 14), whether the content of the article accurately supports the article's title, and so on. The validation server 20 (and/or third-party reviewers) are therefore able to use various criteria for determining the reliability of each of a number of ingredients of the article to determine an overall credibility source as well as determine any possible issues that might indicate that the article includes bias, unverifiable statements, logical fallacies, intentional deception, etc.

In some embodiments, the validation server 20 may be incorporated into one of the content-sharing platforms 16. This would enable the respective content-sharing platform 16 to perform a self-evaluation procedure to ensure that the content they provide is relatively reliable and can be trusted as true or unbiased before the articles are published or made available for access. Also, if an article is found to have a low credibility score, it may be determined that the article will not be published or made accessible in order to maintain a high credibility or reliability. Otherwise, the publisher may be seen by the public as biased, unreliable, or untrustworthy.

The validation server 20 may be associated with a Certificate Authority (CA) or other trusted agency (e.g., DigiCert) that can provide a certification that the publisher is authentic, the reliability of the publisher, etc. Thus, the validation server 20 may be configured to provide a cloud-based service for evaluating online content to verify that the content is provided by a reliable source, whether or not the source of the content wishes to be evaluated, etc. For example, online articles that are not validated may start with a low credibility score until they can be rigorously evaluated by the validation server or other trusted entity.

Validation Server

Figure 2:
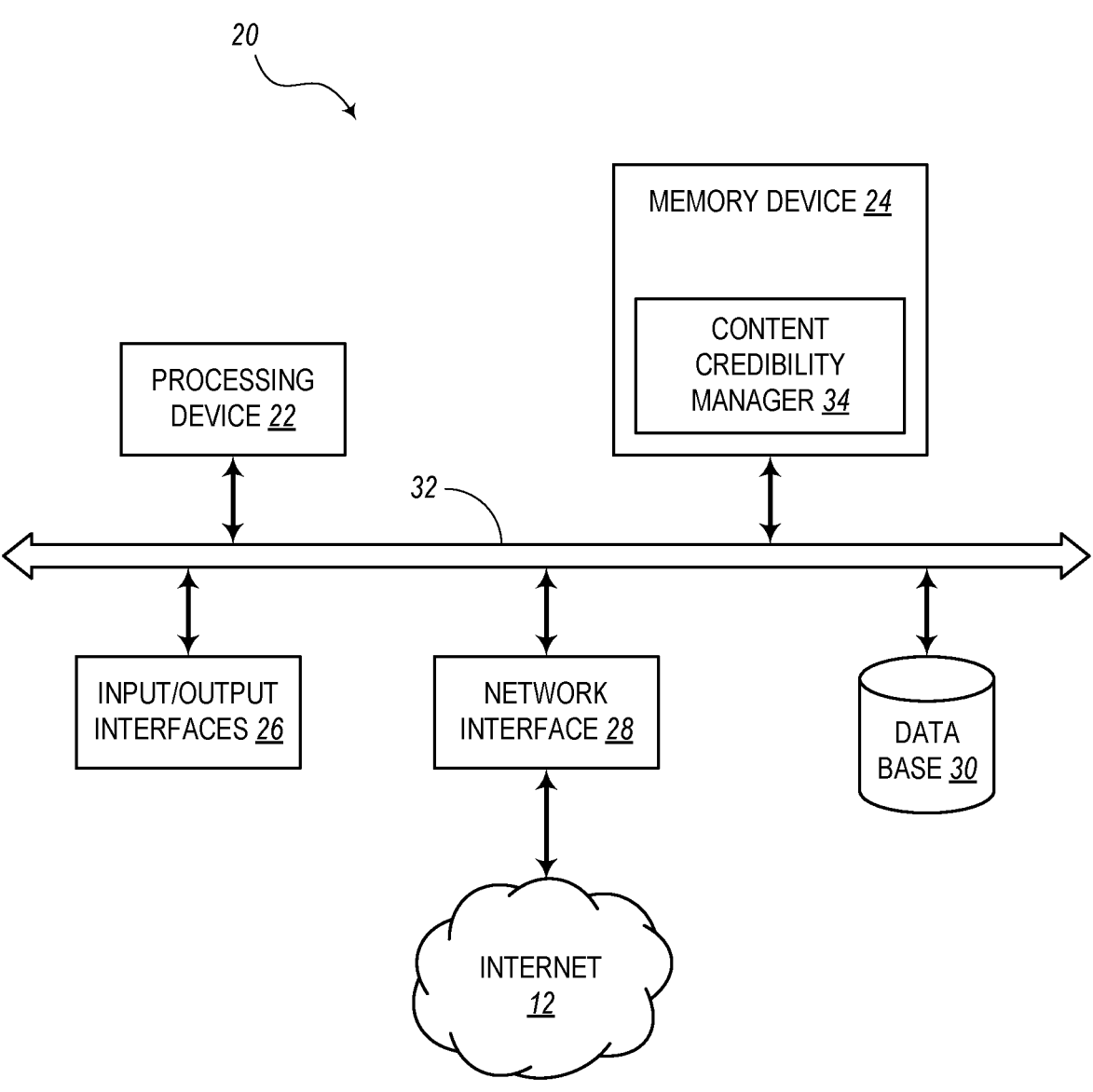
FIG. 2 is a block diagram of the validation server shown in FIG. 1, according to various embodiments.

FIG. 2 is a block diagram showing an embodiment of the validation server 20 shown in FIG. 1. In some embodiments, FIG. 2 may also represent other devices (e.g., content-sharing platforms 16, content contributors 18, etc.) of the system 10. The validation server 20 may be a digital computer that, in terms of hardware architecture, generally includes a processing device 22, memory device 24, input/output (I/O) interfaces 26, a network interface 28, and a database 30 (or data store). It should be appreciated by those of ordinary skill in the art that FIG. 2 depicts the validation server 20 in an oversimplified manner, and a practical embodiment may include additional components and suitably configured processing logic to support known or conventional operating features that are not described in detail herein. The components (22, 24, 26, 28, 30) are communicatively coupled via a local interface 32. The local interface 32 may be, for example, but not limited to, one or more buses or other wired or wireless connections, as is known in the art. The local interface 32 may have additional elements, which are omitted for simplicity, such as controllers, buffers (caches), drivers, repeaters, and receivers, among many others, to enable communications. Further, the local interface 32 may include address, control, and/or data connections to enable appropriate communications among the aforementioned components.

The processing device 22 is a hardware device for executing software instructions. The processing device 22 may be any custom made or commercially available processor, a Central Processing Unit (CPU), an auxiliary processor among several processors associated with the validation server 20, a semiconductor-based microprocessor (in the form of a microchip or chipset), or generally any device for executing software instructions. When the validation server 20 is in operation, the processing device 22 is configured to execute software stored within the memory device 24, to communicate data to and from the memory device 24, and to generally control operations of the validation server 20 pursuant to the software instructions. The I/O interfaces 26 may be used to receive user input from and/or for providing system output to one or more devices or components.

The network interface 28 may be used to enable the validation server 20 to communicate on a network, such as the Internet. The network interface 28 may include, for example, an Ethernet card or adapter or a Wireless Local Area Network (WLAN) card or adapter. The network interface 28 may include address, control, and/or data connections to enable appropriate communications on the network. The database 30 may be used to store data. The database 30 may include volatile memory elements (e.g., random access memory (RAM, such as DRAM, SRAM, SDRAM, and the like)), nonvolatile memory elements (e.g., ROM, hard drive, tape, CDROM, and the like), and/or combinations thereof.

Moreover, the database 30 may incorporate electronic, magnetic, optical, and/or other types of storage media. In one example, the database 30 may be located internal to the validation server 20, such as, for example, an internal hard drive connected to the local interface 32 in the validation server 20. Additionally, in another embodiment, the database 30 may be located external to the validation server 20 such as, for example, an external hard drive connected to the I/O interfaces 26 (e.g., SCSI or USB connection). In a further embodiment, the database 30 may be connected to the validation server 20 through a network, such as, for example, a network-attached file server.

The memory device 24 may include volatile memory elements (e.g., random access memory (RAM, such as DRAM, SRAM, SDRAM, etc.)), nonvolatile memory elements (e.g., ROM, hard drive, tape, CDROM, etc.), and/or combinations thereof. Moreover, the memory device 24 may incorporate electronic, magnetic, optical, and/or other types of storage media. Note that the memory device 24 may have a distributed architecture, where various components are situated remotely from one another but can be accessed by the processing device 22. The software in memory device 24 may include one or more software programs, each of which includes an ordered listing of executable instructions for implementing logical functions. The software in the memory device 24 includes a suitable Operating System (O/S) and one or more programs, such as content credibility manager 34. The O/S essentially controls the execution of other computer programs, such as the content credibility manager 34, and provides scheduling, input-output control, file and data management, memory management, and communication control and related services. The one or more programs (e.g., content credibility manager 34) may be configured to implement the various processes, algorithms, methods, techniques, etc. described herein.

Of note, the general architecture of the validation server 20 can define any device described herein. However, the validation server 20 is merely presented as an example architecture for illustration purposes. Other physical embodiments are contemplated, including virtual machines (VM), software containers, appliances, network devices, and the like.

In an embodiment, the various techniques described herein can be implemented via a cloud service. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. The phrase "Software as a Service" (SaaS) is sometimes used to describe application programs offered through cloud computing. A common shorthand for a provided cloud computing service (or even an aggregation of all existing cloud services) is "the cloud."

The content credibility manager 34 may be implemented in any suitable combination of hardware, software, firmware, etc. in the validation server 20. For example, when implemented in software or firmware, the content credibility manager 34 may be stored in a non-transitory computer-readable medium (e.g., memory device 24) and executed by one or more suitable processors (e.g., the processing device 22). In some embodiments, the content credibility manager 34 may be implemented in hardware (e.g., in the processing device 22) and may include an Application Programming Interface (API).

Structural Ingredients of Content

Figure 3:
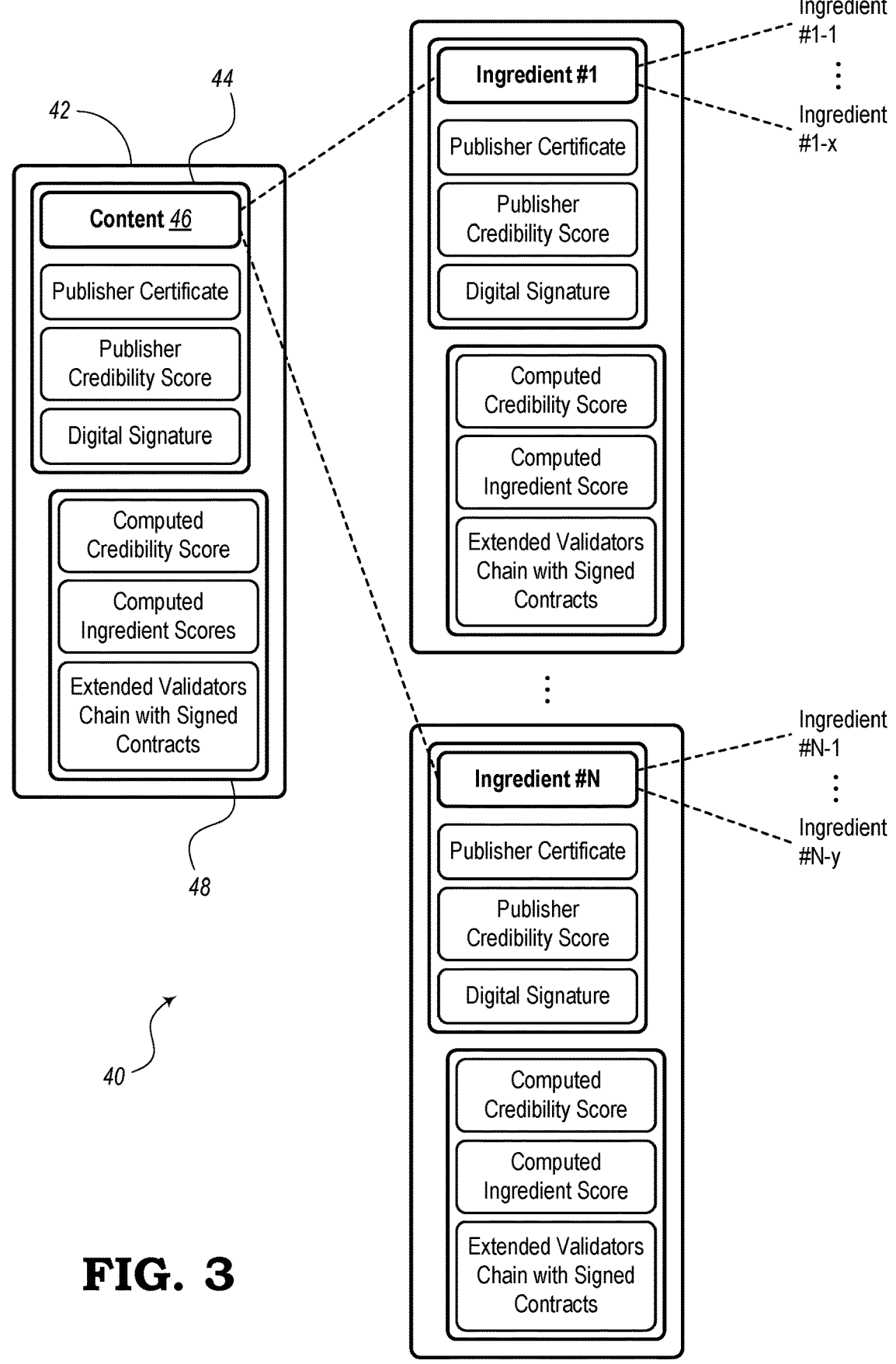
FIG. 3 is a diagram illustrating an example of a content chain that defines sources or ingredients of an online article.

FIG. 3 is a diagram illustrating an example of a content chain 40 that defines sources (or ingredients) of an online article. The content chain 40 may be incorporated with other metadata that accompanies the online article. Thus, when the online article is accessed by a content consumer or end user, the metadata and information contained in the content chain 40 can be viewed as well.

As shown, the content chain 40 includes a field 42 that represents a page that the content consumer is currently viewing. For example, this may represent the overall content as presented to the content consumer. The field 42 includes a label 44, which is the immediately visible aspects displayed for the content consumer when the online article is first presented. The label 44 includes, for example, the content 46 of the online article, which may include textual and/or graphical aspects. That is, the online article may simply include text only, graphics only, or a combination of text and graphics. The graphics, for example, may include photographs, drawings, diagrams, charts, graphs, tables, etc.

The label 44 may also include a publisher certificate, which may be a digital certificate issued by a Certificate Authority (CA) (e.g., validation server 20). The label 44 may also include a publisher credibility score, representing a score associated with the publisher (e.g., individual, organization, news source, etc.) that provides the media content. This score may be based on an average score representing past credibility as well as the scores of other sources upon which the article relies for reference to quotes, statistics, statements, etc. Also, the label 44 may include a digital signature from the CA, validation server 20, or other entity responsible for providing an unbiased review.

In addition to the label 44, the field 42 includes additional metadata, which can be hidden or revealed upon demand. The additional metadata may include a computed credibility score, computed ingredient scores, and extended validators chain with signed contracts. In some embodiments, the computed credibility score can be the overall score of the online article and may be based on a plurality of factors, such as the publisher credibility score, the credibility scores of each of the sources or ingredients, a review of the online article with respect to an interpretation or reproduction of known aspects, etc.

Also, FIG. 3 shows that the content 46 may include any number (N) of ingredients (e.g., components, resources, sources, etc.). Each ingredient may further include the same structure as the field of the overall article, including a label and additional metadata. The label and additional metadata may be obtained from a previous review of the corresponding ingredient (if one were made) or can be evaluated for authenticity when the overall article is analyzed. Furthermore, each of the ingredients 1-N may be an original source or may further include one or more sub-ingredients. Also, each sub-ingredient may include one or more sub-sub-ingredients, and so on.

Figure 4:
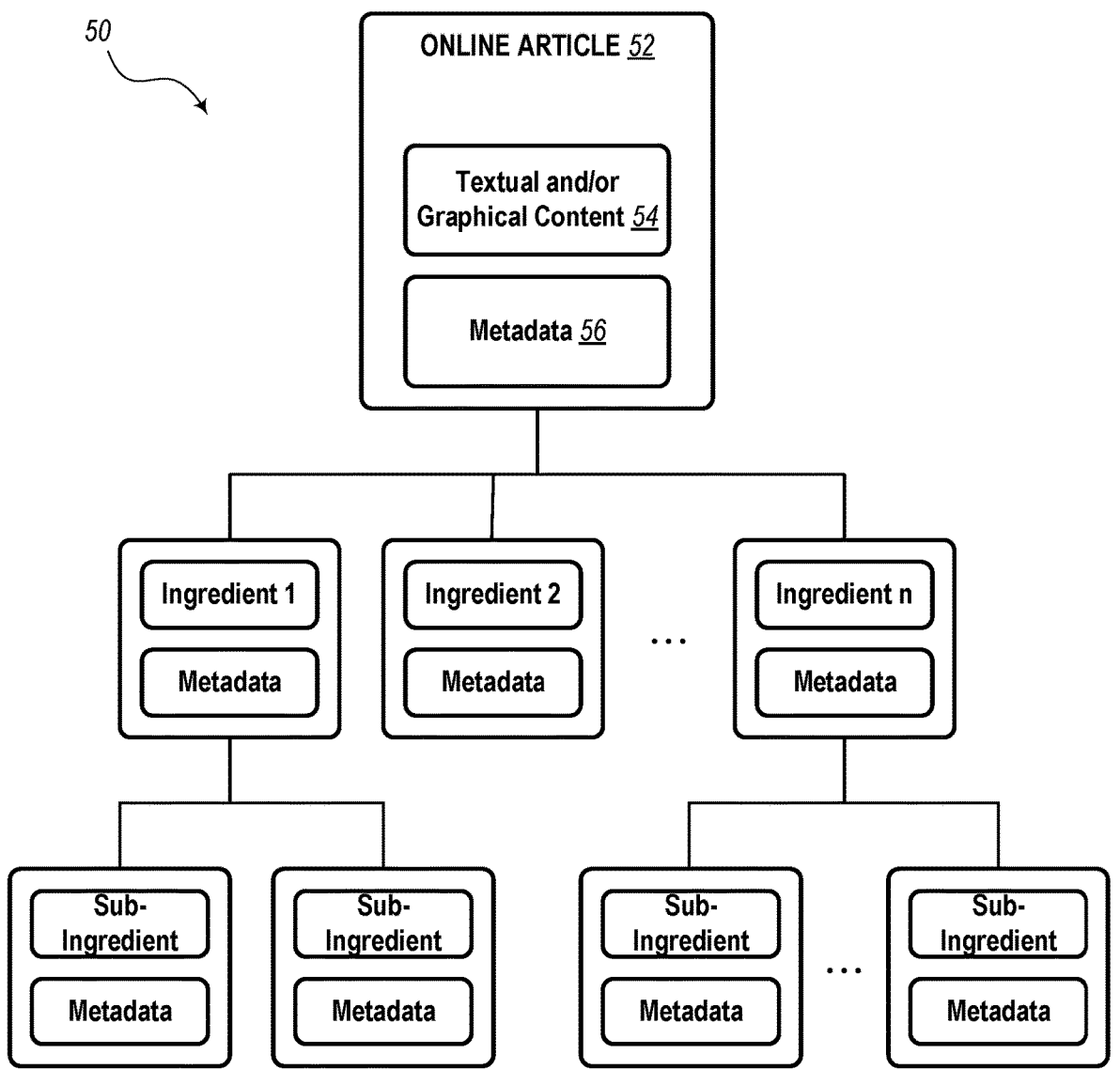
FIG. 4 is a diagram illustrating an example of a content tree that defines sources or ingredients of an online article.

FIG. 4 is a diagram illustrating an example of a content tree 50 that defines sources or ingredients of an online article. As shown, the content tree 50 includes the online article 52 itself, which is the article that can be viewed by a content consumer. The online article 52 includes textual and/or graphical content 54 and metadata 56. The textual and/or graphical content 54 is the description of some topic as well as accompanying pictures, photos, etc. This is the regular information that is normally provided to a content consumer. However, according to the embodiments of the present disclosure, the online article 52 further includes metadata that includes supplementary information related to the content. The metadata 56, for example, may include a publisher name, an author, a publication date, an article title, a chain or list or tree of the various components or ingredients that make up the article, the overall credibility score of the online article 52, and the credibility scores of each of the various ingredients.

Again, each ingredient 1-$n$ may include portions of the overall content along with related metadata of that portion. It may be noted that some conclusions may be derived and presented in the textual and/or graphical content 54 based on information in one or more of the ingredients 1-$n$. An analysis of how accurately these conclusions are drawn can be used in the calculation of the overall credibility score. Furthermore, each ingredient may include one or more sub-ingredients, each having related metadata. The analysis of the credibility of each portion of content may include review of accuracy, reliability of sources, reliability of translations or interpretations, logical progressions, and nonsequiturs, etc. The metadata 56 can include a number of issues where the online article 52 itself and/or ingredients (and sub-ingredients) veers from truth, accuracy, reliability, etc., and can include a calculation of credibility scores based on these issues. The content credibility manager 34 may be configured to use any suitable evaluation computation to weigh various deficiencies in logic or accuracy to decrease the scores.

Figure 5:
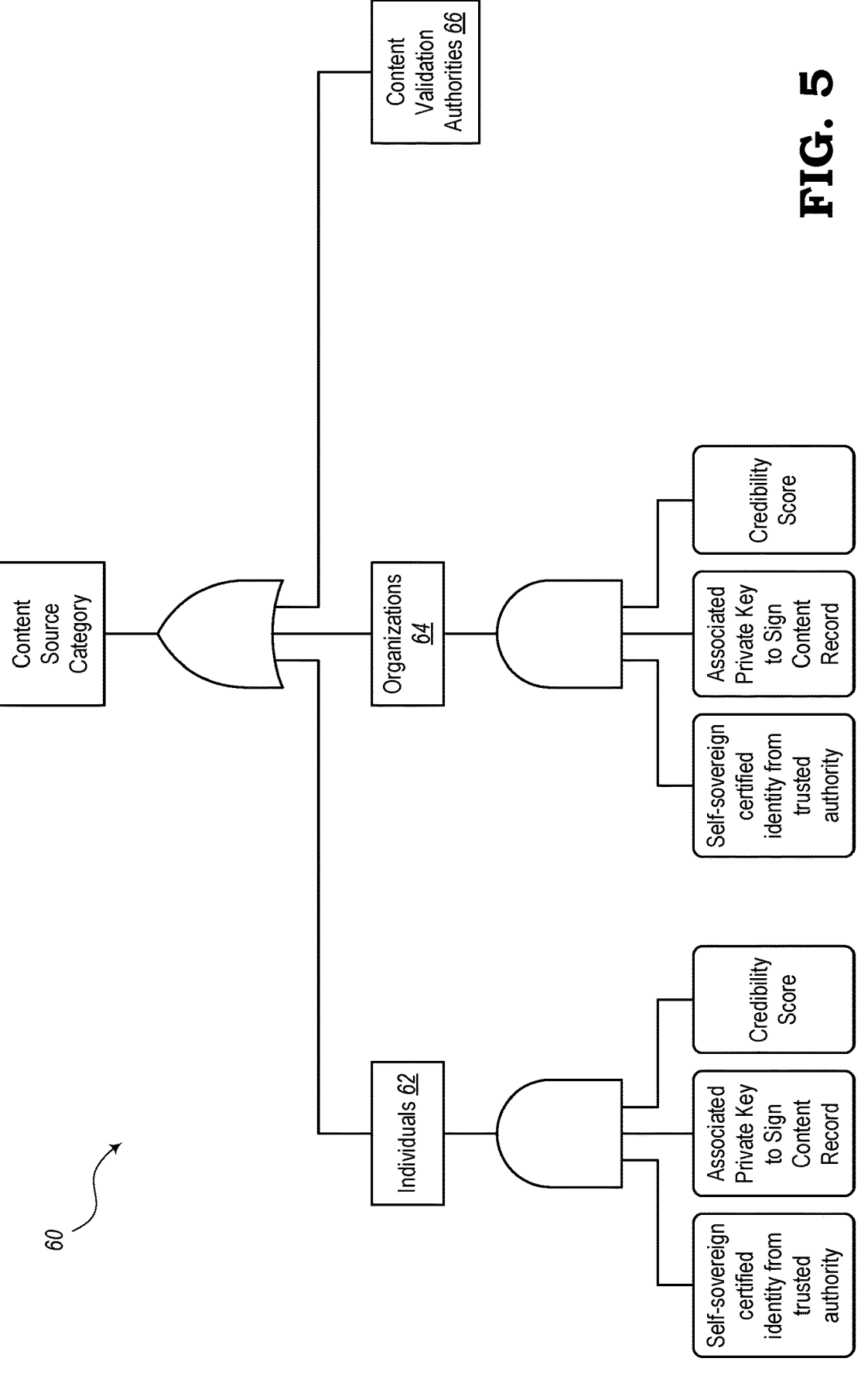
FIG. 5 is a diagram illustrating a content validation chart, according to various embodiments.

FIG. 5 is a diagram illustrating an embodiment of a content validation chart 60. The validation of an online article can be determined by the content validation chart 60 by adding a self-sovereign certified identity from a trusted authority, an associated private key to sign a content record, and a credibility score. This summation may be used for individuals 62 (e.g., individual influencers, bloggers, etc.). Also, a summation of a self-sovereign certified identity from a trusted authority, an associated private key to sign a content record, and a credibility score may be calculated for one or more organizations 64 (e.g., online publishing companies, news providers, government agencies, etc.). The content validation chart 60 further includes input from one or more content validation authorities 66 (e.g., validation server 20, DigiCert, trusted organization, fact checkers, Better Business Bureau, etc.). Any one of the inputs from the individuals 62, organizations 64, or content validation authorities 66 is provided as a content source category and may be related to the credibility scores (or other metadata) of each.

The validation server 20 may include automated procedures as well as human reviewers for evaluating content. The validation server 20 can manage the trust level of the content with respect to others who might be validating the content. Again, other reviewers may be categorized by one of three entities 62, 64, 66, as shown in FIG. 5. Individuals 62 may now have self-sovereign identity. Regardless of the category, each entity may have a certain way of certifying the origin of content, such as using an immutable filing procedure (e.g., a blockchain model, cryptocurrencies-like model, etc.) where everybody has their own self-sovereign certificate and keywords they can use to sign their own content. There are also organizations 64 who have their own way to sign their own content. However, there are also content validation authorities 66 (e.g., DigiCert), who can be independent, non-biased parties that content providers can use to provide a fair evaluation of online content.

User Interface Examples

Figure 6A:
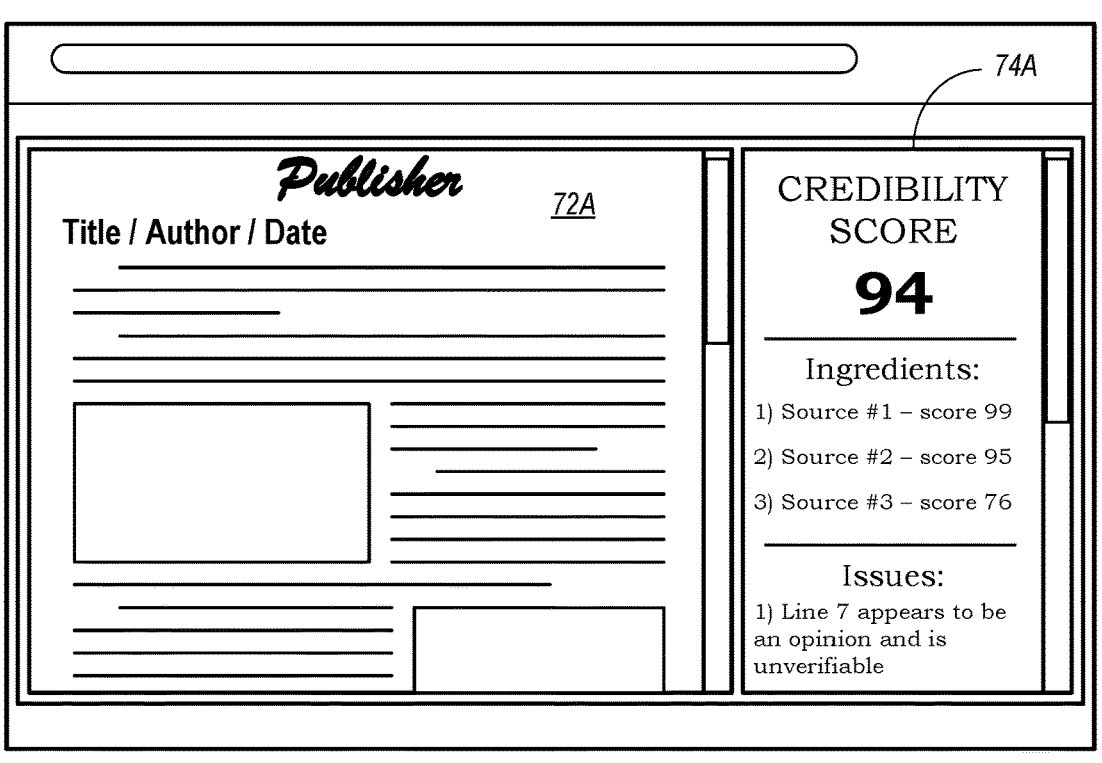
FIGS. 6A and 6B are diagrams illustrating user interfaces for showing online articles and related metadata, according to various embodiments.
Figure 6B:
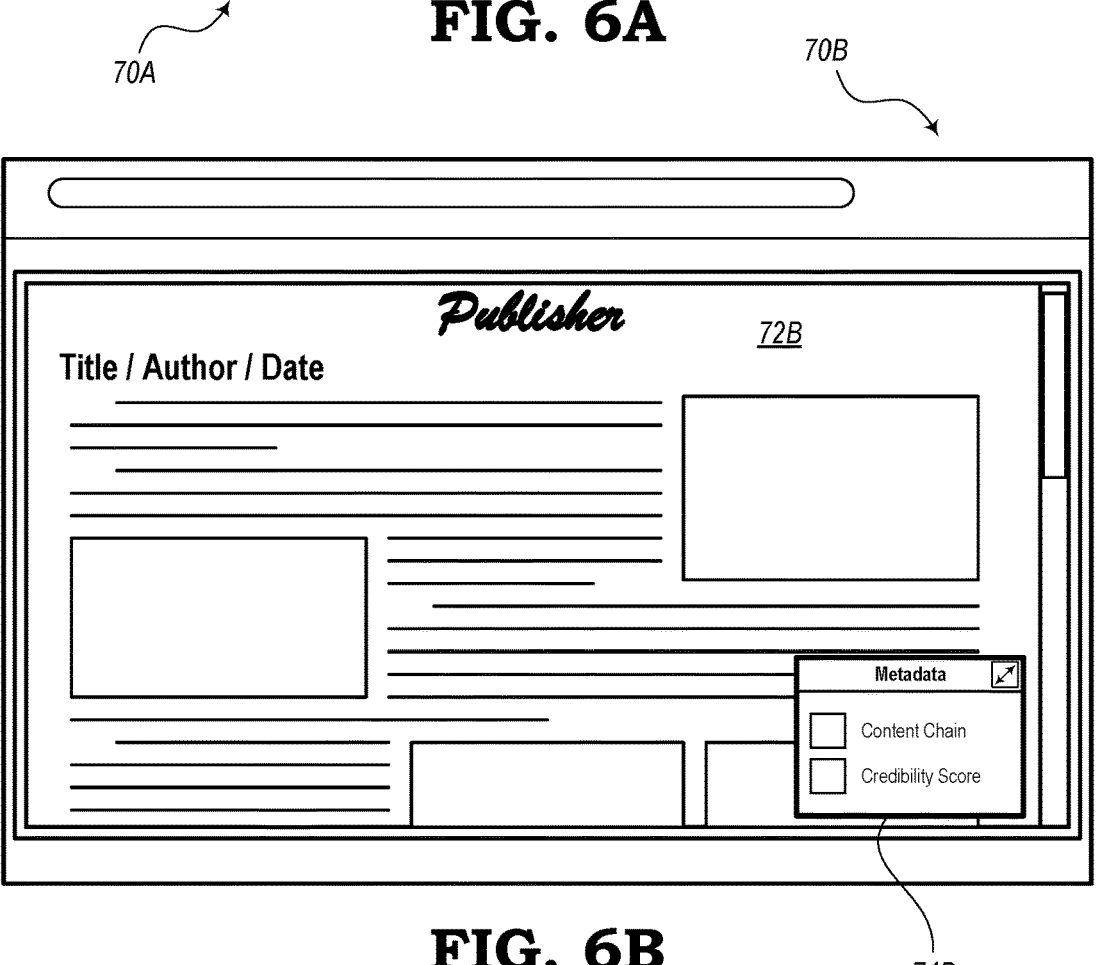

FIGS. 6A and 6B are diagrams illustrating examples of user interfaces 70A, 70B for showing online articles and related metadata. In FIG. 6A, the user interface 70A includes, among other things, a content window 72A that includes the content of the online article. The content, for example, may include textual and/or graphical components. Furthermore, the user interface 70A includes a credibility information window 74A, which may be located adjacent to the content window 72A (e.g., to the side of, above, or below the content window 72A).

The credibility information window 74A may include various credibility information or metadata associated with the content. For example, in this embodiment, the credibility information window 74A displays a credibility score of the content, a list of ingredients of the content, and potential issues that may be used in the calculation of the score. In this example, the content displayed in the content window 72A is given a credibility score of 94 (e.g., out of 100), includes three ingredients (i.e., "Source #1," "Source #2," and "Source #3) each having their own respective credibility scores (i.e., 99, 95, and 76, respectively), and has a first issue where an evaluation shows that line 7 of the article appears to be an opinion and is unverifiable from the cited ingredients. Other issues may be presented and can be accessed by scrolling through the credibility information window 74A.

In FIG. 6B, the user interface 70B includes, among other things, a content window 72B that includes content of the online article. Again, the content may include textual and/or graphical components. The user interface 70B further includes a metadata window 74B, which may be superimposed over the content window 72A or may be presented in any suitable manner on the user interface 70B.

The metadata window 74B, according to this embodiment, may include options for displaying a content chain (e.g., chain, tree, hierarchy, etc.) representing the sources or ingredients of various information in the content. The user (e.g., content consumer 14) may click on or select in any suitable manner the content chain to view the resources used for creating the content. Another option allows the user to select a credibility score. When selected, a credibility score (e.g., similar to FIG. 6A) may be shown to indicate the overall score of the online article. The content chain and/or credibility score can be displayed in the same or different windows and/or may be displayed in a manner as shown in FIG. 3 to provide the user with information to allow the user to determine immediately the reliability, trustworthiness, or credibility of the online article. Again, if the score is low or if unreliable resources are used, the user can quickly see the issues and know upfront whether the online article is reliable and/or if there are possible issues with parts of the online article.

Content Evaluating Process

FIG. 7 is a flow diagram illustrating an embodiment of a method 80 (or process) for evaluating online articles. The method 80 may include steps and/or computer logic stored on one or more non-transitory computer-readable media for implementation or execution by one or more processors (e.g., the processing device 22). The computer logic of the method 80 may be implemented as code in the content credibility manager 34 shown in FIG. 2.

The method 80 includes the step of evaluating an online article to derive credibility information, as indicated in block 82. The online article, for example, may include textual and/or graphical content that is accessible via one or more content-sharing platforms. Furthermore, the method 80 includes the step of adding the credibility information to metadata associated with the online article such that the credibility information is viewable by an end user when the online article is accessed, as indicated in block 84.

In some embodiments, the credibility information may include a credibility score. The method 80 may further include a step of calculating the credibility score based on a publisher credibility score, a plurality of ingredient credibility scores related to a plurality of ingredients making up the textual and/or graphical content of the online article, and a third-party verification credibility score. The step of calculating the credibility score, for example, may include weighting each of the plurality of ingredient credibility scores based on an estimated percentage that each respective ingredient contributes overall to the online article. The method 80 may further include a step of updating the credibility score based on changes to the publisher credibility score, plurality of ingredient credibility scores, and/or third-party verification credibility score.

According to additional implementations, the method 80 may further include a step of determining a chain or tree that includes provenance information (e.g., source information, origination information, etc.) regarding a plurality of ingredients that make up the textual and/or graphical content of the online article. The method 80 may further include the steps of a) creating an immutable file including the provenance information and publication dates of each ingredient, and b) adding the immutable file to the metadata. For each ingredient, the method 80 may include a step of determining an accuracy of a citation, interpretation, or translation of the respective ingredient with respect to the online article.

In addition, the method 80 may further include a step of determining whether the textual content includes one or more instances of satire, parody, opinion, unverifiable statements, inaccurate statements, propaganda, deceptive title, and/or logical fallacies. Also, the method 80 may include a step of incorporating information regarding the one or more instances within the metadata to enable the end user to view the one or more instances along with the textual content. Furthermore, the method 80 may enable a third-party reviewer to modify or add to the credibility information based on presence of the one or more instances.

In some embodiments, the method 80 may further include a step of creating a view that includes at least a portion of the textual and/or graphical content and at least a portion of the metadata. This portion of the metadata may include at least a credibility score that estimates credibility of the online article. The method 80 may further include a step of enabling the end user to expand a window to view a larger portion of the metadata.

Furthermore, the method 80 may also include a step of enabling one or more third-party reviewers to analyze the online article to determine the accuracy of the credibility information and to modify the credibility information accordingly. Also, the method 80 may include a step of enabling the one or more third-party reviewers to apply an X509 certificate to the online article.

ADDITIONAL FEATURES

Therefore, according to various embodiments, the systems and methods of the present disclosure are configured to compute a content credibility score and may further be configured to create chain representing the content ingredients and sub-ingredients that make up the overall content of an online article. By providing credibility information, the embodiments of the present disclosure are configured to evaluate content shared on the Internet that is accessible by an ordinary end user. The systems and methods are intended to provide a fair analysis of the content to indicate to the content consumer whether the information they are receiving is reliable or not. Since conventional systems do not offer such a service, content consumers may trust misinformation, propaganda, etc. that has been found to be unreliable or has not been evaluated, peer reviewed, or analyzed for credibility. However, the embodiments of the present disclosure can analyze the content in an unbiased, sophisticated manner to show when the content is biased toward a particular leaning, include unconfirmed or unverifiable statements, etc.

In some cases, content can intentionally be given a low score when there is little to confirm that the content is reliable until further analysis can be made. Then, as more analysis is performed, certain statements, statistics, graphics, etc. can be evaluated and given a more accurate score. Thus, the credibility scores of the overall content, as well as each ingredient or resource, can be variable. If certain statements are found to be unreliable (e.g., including nonsequiturs, including misleading information, intentionally twisting facts towards a certain bias, etc.), then the credibility scores can be reduced accordingly, using any suitable weighting algorithms and/or using common sense by human reviewers. On the other hand, if unusual statements or quotes cannot be initially confirmed but are later confirmed as being true or accurate, then the credibility scores can be raised accordingly.

The credibility scores can use any suitable formulas or algorithms, as well as general unbiased human evaluation by trusted content validation authorities 66. The credibility scores can be based on following factors:

a) Publisher's credibility;

b) Sub-Content/Ingredients credibility score;

c) Credibility contracts associated with the content published, wherein the contracts could be issued by:

Individuals

Organizations

Credibility Verification Authorities (e.g., organizations can perform extended formal content validation)

According to the implementations discussed herein, the content that is shared or published can show the chain of all the content ingredients and sub-contents, which could be used directly to compose the content or indirectly used to derive the final content. In some embodiments, the credibility score could be a detection of how accurately the source is cited. For example, a lower score may be calculated if the content arrives at a different conclusion than the actual source. Also, a lower score may result if a source is misquoted. A lower score could result if the content over-emphasizes certain minor points of a source, connects unrelated aspects to draw a different conclusion or result, or other improper manipulation of facts, quotes, logic, etc. that could deceive an ordinary content consumer.

This may allow the complete disclosure of the sub-content involved in creating the final content. The derived model may allow a Generative AI engine to disclose the sourced information used to provide predictions and inferences. In some cases, human reviewers may be needed to confirm that combined information does not divert into inaccuracies, biases, misinformation, etc. Systems and methods of the present disclosure may allow the content and sub-contents to be signed, using a blockchain model, making the published chain immutable. In this way, an accurate chain or tree can be produced to show the origins of all components of an online article. In addition, the present systems and methods allow the published content and sources to have definitive association and recorded credit to the content owner, whereby "content provenance" can be recorded.

In some respects, content of any website may be displayed as if it is a soup can or any other packaging for some food product. Although the marketing information may be important and is usually provided on the front of the packaging (e.g., name of company, name of product, flavors, superlatives, etc.), important information may also be provided on the back of the packaging (i.e., list of ingredients, nutrients, calories, fat, etc.).

Thus, similar to requirements by the Food and Drug Administration (FDA) for disclosing the ingredients to a food consumer, government agencies (e.g., Federal Communications Commission (FCC), etc.) can legislate criteria for providing content on the Internet so that content providers cannot intentionally deceive viewers. Therefore, if certain people are more susceptible to believing any propaganda supporting their predetermined biases, which might lead to hate and even violence toward other people, then it would behoove government agencies to enact a reliability checking system that warns content consumers about content that may not be completely trustworthy and should be considered with some precaution. Therefore, if people choose to view (and will likely believe) news, information, or other content from certain biased sources (e.g., MSNBC, Fox News, etc.), then it would be beneficial, not only to the individuals viewing the content but also the communities at large, that the people are warned that the information they are consuming may be biased, unreliable, inaccurate, fake, satirical, opinioned, illogical, unverifiable, etc.

In some embodiments, the systems of the present disclosure may further be configured to determine if online content is based on a source related to Artificial Intelligence (AI), such as ChatGPT or Generative AI. The present systems can evaluate the provenance, source, or origin of the content and whether the AI engines have accurately captured the original content. Otherwise, an artificially concocted story may be developed that has no credibility whatsoever or one that is clearly (from a human perspective) skewed from reality or truth.

It may be noted that the embodiments described herein are configured to utilize some variable aspects, because some content might not be as black and white as one might hope. With this indefiniteness, a credibility score can be lowered along with an explanation (e.g., see FIG. 6A) that certain details cannot be confirmed without sufficient evidence, scientific study, peer review, etc.

Again, credibility scores can go up or down dynamically. In some respects, scores for review authorities (e.g., validation server 20) can go up or down, based on their credibility. For example, if XYZ authority tends to evaluate content from a biased perspective, and if this bias is brought into question and is confirmed by other reviewing authorities, then the score of the XYZ authority might be reduced accordingly. In some cases, it may be determined that an unknown authority (e.g., an individual or small organization) digitally signs content as legitimate and is found to be illegitimate or lacking in sufficient credibility, resulting in the disqualification or severe lowering of credibility score for the authority. In other cases, an individual or small organization (e.g., Snopes.com) responsible for fact-checking, myth busting, hoax detection, and the like can have a credibility score that increases or decreases based on recent evaluations of the individual or small organization.

In some embodiments, certain significant statements in online content, which may be repeated from a prior source, can be evaluated. In order to reduce the "echo chamber" effect, where multiple sources repeat the same statement, the original source can be evaluated to determine if the original statement is true or reliable. If not, any sources relying on the same defective component or ingredient can be dropped in credibility based on citing an original source that is not reliable. Also, in some embodiments, an online article may be first published with errors. If certain elements are found, the author may edit the online article (such as by removing the errors), which may result in an increase in credibility, since it no longer relies on repeated misinformation of the echo chamber.

X509 Certificate

A Certificate Authority (CA) is an entity that stores, signs, and issues digital certificates. This allows others (relying parties) to rely upon signatures or on assertions made about the private key that corresponds to the certified public key. A CA acts as a trusted third party—trusted both by the subject (owner) of the certificate and by the party relying upon the certificate. For certificate authorities, existing individual validation processes involve the use of third-party verification services to validate basic individual information such as first name, last name, professional title, etc. However, these processes do not include the option to validate and incorporate an individual's crypto wallet address. As cryptocurrency becomes more prevalent, there is an increasing need for a secure, verified method of associating crypto wallet addresses with individuals.

Again, the present disclosure includes wallet information in an X509 certificate that was issued from a trusted Certificate Authority (CA). For example, the wallet information can be included in the Subject Alternative Name (SAN) field of an X509 certificate. The present disclosure enhances the existing individual validation process by incorporating the option for an individual to supply a crypto wallet address. This address is captured, validated, and stored in a database along with the individual's basic information. An X509 personal certificate containing all the individual information, as well as the wallet address, is then generated, which can be used to sign digital content.

X509 certificates are defined by ITU X509, Information technology—Open Systems Interconnection—The Directory: Public-key and attribute certificate frameworks, October 2019, the contents of which are incorporated by reference in their entirety. An X509 certificate binds an identity to a public key using a digital signature. A certificate contains an identity (a hostname, or an organization, or an individual) and a public key (e.g., RSA, DSA, ECDSA, ed25519, etc.), and is signed by a certificate authority. X509 also defines certificate revocation lists, which are a means to distribute information about certificates that have been deemed invalid by a signing authority, as well as a certification path validation algorithm, which allows for certificates to be signed by intermediate CA certificates, which are, in turn, signed by other certificates, eventually reaching a trust anchor.

When a certificate is signed by a trusted certificate authority, or validated by other means, someone holding that certificate can use the public key it contains to validate documents or content digitally signed by the corresponding private key.

In an embodiment, an X509 certificate can be used to digitally sign content. A content signing certificate allows individuals, teams, and organizations to add an electronic, digital signature to a document or other content in a variety of file formats to prove ownership. The digital signature is an encrypted hash of your message that can only be decrypted by someone who has a copy of your public key, which ensures (1) content stays unaltered, (2) the creator's identity is confirmed, and the like.

A digital signature cryptographically binds a digital signature certificate, issued by a trust services provider (TSP), to a document using public key infrastructure (PKI) technology. Digital signatures validate and authenticate signer identity and document integrity, delivering higher levels of assurance that the signer is who they say they are and that the document has not been altered. Digital signatures are ideal for transactions that require higher level of security and are necessary in certain countries and regions where companies are required to comply with legal regulations. In some countries, some forms of digital signatures have legal validity equivalent to handwritten signatures.

In another embodiment, the X509 certificate can be referred to as a personal certificate, i.e., it does not necessarily need to be used to digitally sign content. In a further embodiment, the X509 certificate can be a content credential that includes history and identity data attached to content. A user can view this data when a creator or producer has attached it to content to understand more about what has been done to it, where it has been, and who is responsible. Content credentials are public and tamper-evident, and can include info like edits and activity, assets used, identity info, and more.

In a further embodiment, related to signed contracts and assuming a private key or certificate associated therewith is compromised, revoked, etc., the signed contracts are annulled. The associated dynamic credibility computation can take this into account. That is, if a private key is compromised, the scoring could be less credible; thus, it is important to understand and provide notification of such events. For example, a CA can provide a lookup and reporting service for organizations or individuals to report key compromise. This lookup and reporting service can also be queried to adjust any affected dynamic credibility computation.

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method performed by a validation server comprising a processing device, a network interface, and a memory storing computer instructions of a content credibility manager, the validation server being associated with a trusted certificate authority, the method comprising steps of:

evaluating an online article to derive credibility information, the online article including textual and/or graphical content that is accessible via one or more content-sharing platforms;

automatically identifying, from the textual and/or graphical content, a plurality of ingredients that make up the online article, each ingredient corresponding to a respective cited source, statement, statistic, graphical component, or sub-content portion relied upon by the online article;

determining a chain or tree that includes provenance information regarding the plurality of ingredients, the provenance information including at least a source identifier and a publication date of each ingredient;

calculating, by the content credibility manager, an overall credibility score as part of the credibility information based on a publisher credibility score, a plurality of ingredient credibility scores related to the plurality of ingredients, and a third-party verification credibility score, wherein calculating includes weighting each of the plurality of ingredient credibility scores based on an estimated percentage that each respective ingredient contributes overall to the online article;

creating an immutable provenance file including the chain or tree, the provenance information and publication dates of each ingredient, and the overall credibility score, wherein creating the immutable provenance file comprises generating a cryptographic hash of the immutable provenance file and digitally signing the cryptographic hash using an X509 certificate issued by the trusted certificate authority; and adding the credibility information to metadata associated with the online article such that the credibility information is viewable by an end user when the online article is accessed, wherein the metadata includes the immutable provenance file.

2. The method of claim 1, wherein the credibility information includes a credibility score comprising the overall credibility score.

3. The method of claim 2, further comprising a step of calculating the credibility score based on the publisher credibility score, the plurality of ingredient credibility scores, and the third-party verification credibility score.

4. The method of claim 3, wherein the step of calculating the credibility score includes weighting each of the plurality of ingredient credibility scores based on an estimated percentage that each respective ingredient contributes overall to the online article, wherein the estimated percentage is determined from an automated parsing that associates each ingredient with corresponding text spans or graphical regions of the online article.

5. The method of claim 3, of updating the credibility score based on changes to the publisher credibility score, the plurality of ingredient credibility scores, and/or the third-party verification credibility score, and updating the cryptographic hash and digitally signing an updated cryptographic hash after said updating.

6. The method of claim 1, wherein determining a chain or tree that includes determining provenance information comprising origination information for each ingredient in addition to the source identifier and the publication date.

7. The method of claim 6, further comprising steps of:

creating an immutable provenance file including the provenance information and publication dates of each ingredient; and adding the immutable provenance file to the metadata, wherein the immutable provenance file is tamper-evident based on the cryptographic hash and the digital signature.

8. The method of claim 6, further comprising, for each ingredient, a step of determining an accuracy of a citation, interpretation, or translation of the respective ingredient with respect to the online article, and storing an accuracy indicator for the respective ingredient in the chain or tree.

9. The method of claim 1, further comprising a step of determining whether the textual content includes one or more instances of satire, parody, opinion, unverifiable statements, inaccurate statements, propaganda, deceptive title, and/or logical fallacies.

10. The method of claim 9, further comprising a step of incorporating information regarding the one or more instances within the metadata to enable the end user to view the one or more instances along with the textual content, including a location indicator identifying a line, sentence, or graphical region corresponding to each instance.

11. The method of claim 9, further comprising a step of enabling a third-party reviewer to modify or add to the credibility information based on presence of the one or more instances.

12. The method of claim 1, further comprising a step of creating a view that includes at least a portion of the textual and/or graphical content and at least a portion of the metadata.

13. The method of claim 12, wherein the portion of the metadata includes at least a credibility score that estimates credibility of the online article.

14. The method of claim 12, further comprising a step of enabling the end user to expand a window to view a larger portion of the metadata.

15. The method of claim 1, further comprising a step of enabling one or more third-party reviewers to analyze the online article to determine an accuracy of the credibility information and to modify the credibility information accordingly, wherein each modification is recorded as a reviewer attestation in the immutable provenance file.

16. The method of claim 15, further comprising a step of enabling the one or more third-party reviewers to apply an X509 certificate to the online article, wherein applying the X509 certificate comprises digitally signing the reviewer attestation or a modified immutable provenance file using the X509 certificate.

17. A non-transitory computer-readable medium having computer logic that enables a processing device of a validation server associated with a trusted certificate authority to:

evaluate an online article to derive credibility informa-
tion, the online article including textual and/or graphi-
cal content that is accessible via one or more content-
sharing platforms;

automatically identify, from the textual and/or graphical
content, a plurality of ingredients that make up the
online article, each ingredient corresponding to a
respective cited source, statement, statistic, graphical
component, or sub-content portion relied upon by the
online article;

determine a chain or free that includes provenance infor-
mation regarding the plurality of ingredients, the prov-
enance information including at least a source identifier
and a publication date of each ingredient;

calculate an overall credibility score as part of the cred-
ibility information based on a publisher credibility
score, a plurality of ingredient credibility scores related
to the plurality of ingredients, and a third-party verifi-
cation credibility score, wherein calculating includes
weighting each of the plurality of ingredient credibility
scores based on an estimated percentage that each
respective ingredient contributes overall to the online
article;

create an immutable provenance file including the chain
or tree, the provenance information and publication
dates of each ingredient, and the overall credibility
score, wherein creating the immutable provenance file
comprises generating a cryptographic hash of the
immutable provenance file and digitally signing the
cryptographic hash using an X509 certificate issued by
the trusted certificate authority; and add the credibility information to metadata associated
with the online article such that the credibility infor-
mation is viewable by an end user when the online
article is accessed, wherein the metadata includes the
immutable provenance file.

18. The non-transitory computer-readable medium of
claim 17, wherein the credibility information includes a
credibility score, and wherein the computer logic further
enables the processing device to:

calculate the credibility score based on a publisher cred-
ibility score, a plurality of ingredient credibility scores
related to a plurality of ingredients making up the
textual and/or graphical content of the online article,
and a third-party verification credibility score; and weight each of the plurality of ingredient credibility
scores based on an estimated percentage that each
respective ingredient contributes overall to the online
article, wherein the estimated percentage is determined
from automated parsing that associates each ingredient
with corresponding text spans or graphical regions of
the online article.

19. A system comprising:
a processing device; and
a memory device configured to store computer instruc-
tions enabling the processing device of a validation
server associated with a trusted certificate authority to
perform steps of evaluating an online article to derive credibility infor-
mation, the online article including textual and/or
graphical content that is accessible via one or more
content-sharing platforms;

automatically identifying, from the textual and/or
graphical content, a plurality of ingredients that
make up the online article, each ingredient corre-
sponding to a respective cited source, statement,
statistic, graphical component, or sub-content por-
tion relied upon by the online article;

determining a chain or tree that includes provenance
information regarding the plurality of ingredients,
the provenance information including at least a
source identifier and a publication date of each
ingredient;

calculating an overall credibility score as part of the
credibility information based on a publisher cred-
ibility score, a plurality of ingredient credibility
scores related to the plurality of ingredients, and a
third-party verification credibility score, wherein
calculating includes weighting each of the plurality
of ingredient credibility scores based on an estimated
percentage that each respective ingredient contrib-
utes overall to the online article;

creating an immutable provenance file including the
chain or tree, the provenance information and pub-
lication dates of each ingredient, and the overall
credibility score, wherein creating the immutable
provenance file comprises generating a crypto-
graphic hash of the immutable provenance file and
digitally signing the cryptographic hash using an
X509 certificate issued by the trusted certificate
authority; and adding the credibility information to metadata associ-
ated with the online article such that the credibility
information is viewable by an end user when the
online article is accessed, wherein the metadata
includes the immutable provenance file.

20. The system of claim 19, wherein the computer instruc-
tions further enable the processing device to:

determine a chain or tree that includes provenance infor-
mation regarding a plurality of ingredients that make up
the textual and/or graphical content of the online
article, the provenance information including at least
origination information, the source identifier, and the
publication date of each ingredient;

create an immutable file including the provenance infor-
mation and publication dates of each ingredient and the
overall credibility score;

add the immutable file to the metadata, wherein the
immutable provenance file is tamper-evident based on
the cryptographic hash and the digital signature gener-
ated using the X509 certificate; and determine, for each ingredient, an accuracy of a citation,
interpretation, or translation of the respective ingredi-
ent with respect to the online article, and store an
accuracy indicator for the respective ingredient in the
chain or tree.

* * * * *